(12) United States Patent
Liu

(10) Patent No.: US 11,102,145 B2
(45) Date of Patent: Aug. 24, 2021

(54) RESOURCE SHARING METHOD, COMPUTER DEVICE, AND STORAGE MEDIUM

(71) Applicants: HONGFUJIN PRECISION ELECTRONICS (ZHENGZHOU) CO., LTD., Zhengzhou (CN); HON HAI PRECISION INDUSTRY CO., LTD., New Taipei (TW)

(72) Inventor: Yao-Hua Liu, Shenzhen (CN)

(73) Assignees: HONGFUJIN PRECISION ELECTRONICS (ZHENGZHOU) CO., LTD., Zhengzhou (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 16/506,242

(22) Filed: Jul. 9, 2019

(65) Prior Publication Data
US 2020/0358715 A1   Nov. 12, 2020

(30) Foreign Application Priority Data

May 6, 2019   (CN) .......................... 201910374794.0

(51) Int. Cl.
*H04L 12/911* (2013.01)
*H04L 12/26* (2006.01)
(Continued)

(52) U.S. Cl.
CPC .......... *H04L 47/783* (2013.01); *G06N 5/025* (2013.01); *H04L 5/0044* (2013.01); *H04L 5/0055* (2013.01); *H04L 5/0057* (2013.01); *H04L 41/0896* (2013.01); *H04L 43/0876* (2013.01); *H04L 43/10* (2013.01); *H04L 43/16* (2013.01); *H04L 47/2433* (2013.01); *H04L 47/76* (2013.01); *H04L 47/781* (2013.01); *H04L 47/821* (2013.01); *H04L 47/827* (2013.01); *H04L 67/36* (2013.01); *H04W 28/16* (2013.01);
(Continued)

(58) Field of Classification Search
CPC ... H04L 47/783; H04L 67/36; H04L 41/0896; H04L 43/0876; H04L 43/16; H04L 5/0055; H04L 47/76; H04L 47/821; H04L 5/0044; H04L 5/0057; H04L 43/10; H04L 47/2433; H04L 47/781; H04L 47/827; H04W 28/16; H04W 72/044; H04W 72/04; H04W 72/048; H04W 72/08; G06N 5/025
USPC .......................................................... 709/226
See application file for complete search history.

(56) References Cited

U.S. PATENT DOCUMENTS

| | | | |
|---|---|---|---|
| 2012/0176976 A1* | 7/2012 | Wells ................ | H04W 52/0219 370/329 |
| 2015/0040198 A1* | 2/2015 | Gopalakrishnan ........................ | H04L 63/0492 726/5 |

(Continued)

*Primary Examiner* — Chris Parry
*Assistant Examiner* — Weiwei Y Stiltner
(74) *Attorney, Agent, or Firm* — ScienBiziP, P.C.

(57) ABSTRACT

A method for sharing computer device resources includes establishing a sharing domain and storing information of user terminals joined to the sharing domain. Information of shareable resources in the sharing domain is obtained. Requests for allocation of computer device resources such as data storage and data traffic per period may be sent out by a user terminal, and allocations of resources for sharing may be made according to one or more predetermined rules.

14 Claims, 4 Drawing Sheets

(51) Int. Cl.
*H04L 12/24* (2006.01)
*H04W 28/16* (2009.01)
*H04L 29/08* (2006.01)
*G06N 5/02* (2006.01)
*H04W 72/04* (2009.01)
*H04L 12/917* (2013.01)
*H04W 72/08* (2009.01)
*H04L 5/00* (2006.01)
*H04L 12/851* (2013.01)

(52) U.S. Cl.
CPC ......... *H04W 72/04* (2013.01); *H04W 72/044* (2013.01); *H04W 72/048* (2013.01); *H04W 72/08* (2013.01)

(56) References Cited

U.S. PATENT DOCUMENTS

| | | | |
|---|---|---|---|
| 2015/0065085 A1* | 3/2015 | Sheikh Naziruddin | ................... H04W 4/24 455/406 |
| 2016/0143040 A1* | 5/2016 | Rivard | .................. H04W 24/08 370/329 |
| 2016/0261473 A1* | 9/2016 | Gupta | ..................... H04W 4/06 |
| 2018/0020101 A1* | 1/2018 | Chan | ..................... H04M 15/83 |
| 2019/0182838 A1* | 6/2019 | Bondarenko | ..... H04W 72/0486 |

* cited by examiner

RESOURCE SHARING METHOD, COMPUTER DEVICE, AND STORAGE MEDIUM

FIELD

The subject matter herein generally relates to data management.

BACKGROUND

Demand for storage space and traffic of mobile user terminals is always increasing, but storage capacity and allocated traffic on the mobile user terminals are limited. Network technology, with cloud storage and other methods, are widely applied. The cloud storage method stores data in a server provided by a third party. However, as storage needs expand, the burden and cost expand. A user can go online to purchase data traffic allowances in packets or plans regularly. Some users may not be able to stay within their allowance most of the time, and others users may not use up all of their allowance most of the time. Such an arrangement results in wasted resources.

Therefore, there is room for improvement within the art.

BRIEF DESCRIPTION OF THE DRAWINGS

Many aspects of the disclosure can be better understood with reference to the following figures. The components in the figures are not necessarily drawn to scale, the emphasis instead being placed upon clearly illustrating the principles of the disclosure. Moreover, in the drawings, like reference numerals designate corresponding parts throughout several views.

DETAILED DESCRIPTION

Figure 1:
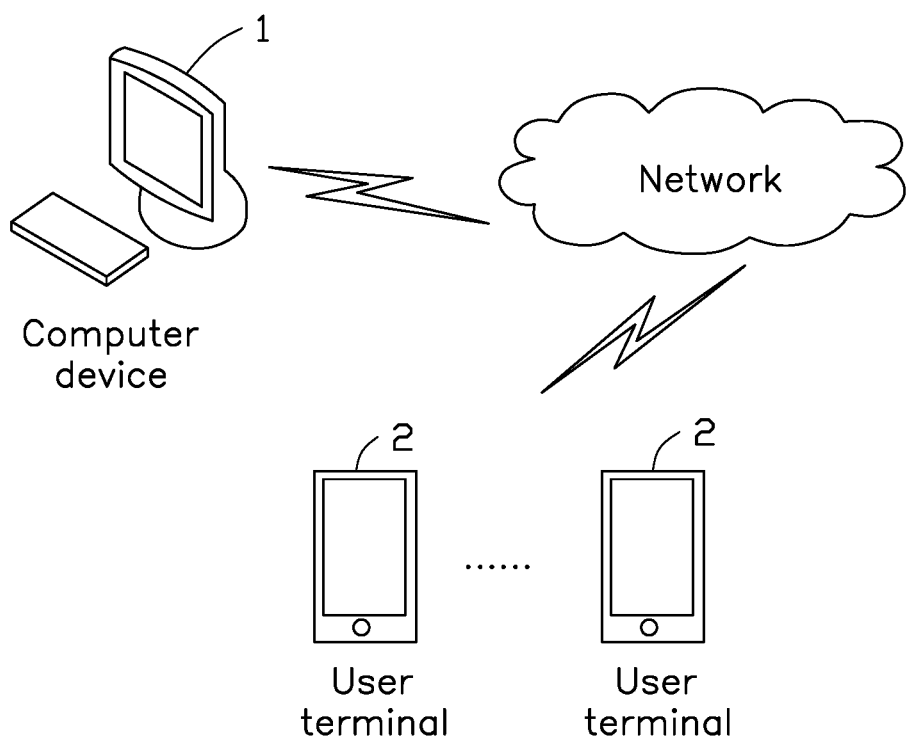
FIG. 1 is an application environment architecture diagram of a resource sharing method according to an embodiment of the present disclosure.

It will be appreciated that for simplicity and clarity of illustration, where appropriate, reference numerals have been repeated among the different figures to indicate corresponding or analogous elements. Additionally, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising" means "including, but not necessarily limited to"; it specifically indicates open-ended inclusion or membership in a so-described combination, group, series, and the like.

In general, the word "module" as used hereinafter refers to logic embodied in hardware or firmware, or to a collection of software instructions, written in a programming language such as, for example, Java, C, or assembly. One or more software instructions in the modules may be embedded in firmware such as in an erasable-programmable read-only memory (EPROM). It will be appreciated that the modules may comprise connected logic units, such as gates and flip-flops, and may comprise programmable units, such as programmable gate arrays or processors. The modules described herein may be implemented as either software and/or hardware modules and may be stored in any type of computer-readable medium or other computer storage device.

FIG. 1 illustrates an application environment of a resource sharing method according to an embodiment of the present disclosure. The resource sharing method is applied to a computer device 1. The computer device 1 establishes a communication with at least one user terminal 2 through a network. The network may be a wired network or a wireless network, such as radio, WI-FI, cellular, satellite, broadcast, and the like.

The computer device 1 is configured to perform privilege management on a user terminal and store sharing resource information. The computer device 1 may be an electronic device having resource sharing software, such as a personal computer, a server, or the like. The server may be a single server, a server cluster, a cloud server, or the like.

The user terminal 2 can be any intelligent electronic device having a storage function and a wireless communication function. The user terminal 2 can be a smart phone, a tablet computer, a laptop convenience computer, a desktop computer, or the like.

Figure 2:
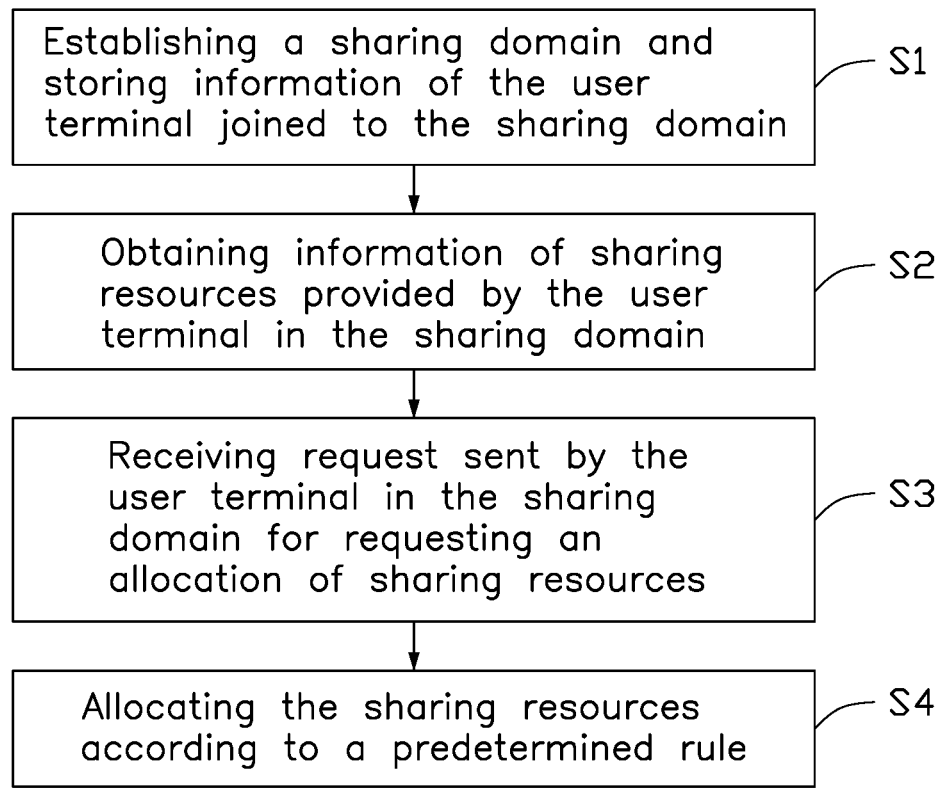
FIG. 2 is a flowchart of a resource sharing method according to an embodiment of the present disclosure.

FIG. 2 illustrates a flowchart of a resource sharing method. The method is provided by way of example, as there are a variety of ways to carry out the method. Each block shown in FIG. 2 represents one or more processes, methods, or subroutines which are carried out in the example method. Furthermore, the order of blocks is illustrative only and additional blocks can be added or fewer blocks may be utilized without departing from the scope of this disclosure.

At block S1, a sharing domain is established and information of the user terminal 2 joined to the sharing domain is stored.

In an embodiment, the computer device 1 stores account information of the sharing domain, password information of the sharing domain, and information of the user terminal 2 belonging to the sharing domain. The computer device 1 controls verification of each user terminal 2 connected to the sharing domain. When the user terminal 2 is connected to the sharing domain, the computer device 1 firstly identifies whether the user terminal 2 belongs to the sharing domain, whether a login account exists, and whether an entered login password is correct. If one of the above is incorrect or not found, the computer device 1 rejects the login of the user terminal.

At block S2, information of sharing resources provided by the user terminal 2 in the sharing domain is obtained.

The sharing resources include a sharing storage space and/or a sharing network traffic. The sharing network traffic includes, but is not limited to, GPRS traffic and WI-FI traffic.

In one embodiment, the method for obtaining information of sharing resources provided by the user terminal 2 in the sharing domain includes at least the following sub-blocks S21 and S22.

At sub-block S21, information of resources available for sharing and provided by the user terminal 2 is obtained.

At sub-block S22, remaining resources of the user terminal 2 are monitored in real time.

In sub-block S22, if the real-time remaining resources are greater than the amount of resources that can be shared, the resources that can be shared by the user terminal 2 is limited only by the sharing resources that the user terminal can provide.

In sub-block S22, if the real-time remaining resources are less than the amount of shareable resources, the real-time remaining resources are the sharing resource limit that the user terminal can provide.

In sub-block S22, the information for providing the sharing resource includes one or more of a content of the sharing resource, a validity date of the sharing resource, and a time when the user terminal provides the sharing resource. If the sharing resource is a sharing network traffic, the obtained sharing network traffic information is stored for grouping according to a validity date of the sharing network traffic.

In one embodiment, the method for grouping and storing the obtained sharing network traffic information according to the validity date of the sharing network traffic may include at least the following sub-blocks S221, S222, and S223.

At sub-block S221, the validity date of the sharing network traffic provided by the user terminal 2 is obtained.

At sub-block S222, the amount of the sharing network traffic provided by the user terminal 2 during the same validity date is summarized.

At sub-block S223, the summarized amount of the sharing network traffic is stored in groups according to different validity dates.

In one embodiment, the sharing resource is a sharing storage space. Since a minimum storage space is required for an operating system of the user terminal 2 and a personal preferences of the user, the user terminal 2 can set a capacity of the storage space available for sharing and a time of the storage space available for sharing. The user terminal further sends the time and capacity of the storage space available for sharing to the computer device.

Within a time range available for sharing the storage space, the computer device monitors remaining capacity of the storage space of the user terminal in real time, and compares same with the capacity of the storage space that can be shared and set by the user terminal. If a capacity of the real-time remaining storage space is larger than that of the available storage space set by the user terminal, the capacity of the storage space that can be shared and set by the user terminal is the capacity of the storage space that can be provided by the user terminal. If the capacity of the real-time remaining storage space is less than that of the available storage space set by the user terminal, the capacity of the real-time remaining storage space is the capacity of the storage space that can be provided by the user terminal.

In another embodiment, the sharing resource is a sharing network traffic. According to an amount of the traffic required by the user terminal itself and a validity date of the traffic, the user terminal sets a time available for sharing the traffic and an amount of the traffic available for sharing during the validity date of the traffic. The user terminal further sends the time available for sharing the traffic, the amount of the traffic available for sharing, and the validity date of the traffic to the computer device. The computer device receives the traffic information that can be shared from multiple user terminals. The computer device firstly summarizes the traffic information within the same validity date according to the validity date of the traffic, and then stores the traffic information according to the different validity dates.

In one embodiment, the unit of the validity date is one day. The computer device summarizes a sum of the traffic that can be shared per day and stores the amount of the traffic that can be shared every day. In other embodiments, the unit of the validity date can be one hour or one minute.

Within a time range available for sharing the traffic, the computer device monitors a real-time traffic of the user terminal in the sharing domain. If the real-time remaining traffic is larger than the sharing network traffic set by the user terminal, a capacity of the sharing network traffic set by the user terminal is the capacity of the traffic that can be provided by the user terminal. If the real-time remaining traffic is less than the sharing network traffic set by the user terminal, a capacity of real-time remaining traffic is the capacity of sharing network traffic that the user terminal can provide.

At block S3, a request sent by the user terminal in the sharing domain for requesting an allocation of sharing resources is received.

The information in the request includes a type, a time, and a quantity of a request to allocate a sharing resource.

For example, in one embodiment, the user terminal makes request to the computer device to allocate 5 GB storage space for one week.

In another embodiment, the user terminal requests an allocation of 300 MB traffic for two days.

In another embodiment, the user terminal requests an allocation of 3 GB storage space for 4 days and 200 MB traffic for one day.

At block S4, the sharing resources are allocated according to a predetermined rule.

In one embodiment, the method for allocating the sharing resources according to a predetermined rule may include at least the following sub-blocks S41, S42, and S43.

At sub-block S41, according to a predetermined rule, whether a request sent by the user terminal meets requirements of a rule.

At sub-block S42, if the request sent by the user terminal meets the requirements of the rule, the sharing resources are allocated to the user terminal.

At sub-block S43, if the request sent by the user terminal does not meet the requirements, feedback information is sent to the user terminal.

In one embodiment, the predetermined rule may be an IP address of the user terminal and a privilege classification of the user terminal. The privilege classification may include one or more of a type, a number, and a time in which the sharing resources that can be shared by the user terminal in the sharing domain.

The privilege classification of the user terminal may be set according to the amount of resources that the user terminal can provide for sharing. The greater the amount of resources that the user terminal can provide for sharing, the greater or more extensive is the privilege classification that the user terminal can obtain.

In another embodiment, the privilege classification of the user terminal may be distinguished according to whether the user terminal is a paying client of the sharing domain. A privilege classification of a paying user terminal is larger or more extensive than a privilege classification of a cost-free user terminal.

In another embodiment, the predetermined rule may further include determining, according to an IP address of the user terminal, a location of the user terminal in the sharing domain. According to the location, a search in the sharing domain for another user terminal available for sharing resources with a location closer to the user terminal may be carried out according to the predetermined rule.

For example, the user terminal is a paying user with user level A in the server. Then the sharing resource types of the user terminal corresponding to the A-level are storage space and traffic, and the capacity of the storage space is 1 GB/day and the capacity of the traffic is 100 MB/day.

The sharing storage space set by the user terminal is 2 GB/day and the traffic that can be shared is 300 MB/day. The storage space and traffic that the user terminal can share every day are greater than the permitted level of the user terminal. The maximum storage space of the user terminal allocated by the server is 1 GB/day, and the traffic is 100 MB/day. When the user terminal requests the sharing of traffic, the server searches for, according to the IP address of the user terminal, another user terminal that is available for sharing network traffic and is closer to the user terminal in the sharing domain.

For another example, the user terminal is a cost-free user. According to the number of the sharing resources that the user terminal can provide, a permitted user level of the user terminal in the sharing domain is determined to be B. Then the sharing resource types of the user terminal corresponding to the B-level are storage space and traffic, and the capacity of the storage space is 800 MB/day and the capacity of the traffic is 80 MB/day.

The sharing storage space set by the user terminal is 500 MB/day and the traffic that can be shared is 50 MB/day. The storage space and traffic that the user terminal can share every day are less than the permitted level of the user terminal. The maximum storage space of the user terminal allocated by the server is 800 MB/day, and the traffic is 50 MB/day.

If two user terminals who are both level B require the computer device to share the storage space of 800 MB/day and the traffic of 50 MB/day, the storage space and the traffic that the server can control may be insufficient to meet the requirements of the two B-level user terminals. The server compares the amount of the sharing resources provided by the two B-level user terminals and preferentially makes an allocation to the user terminal which provides more sharing resources.

Figure 3:
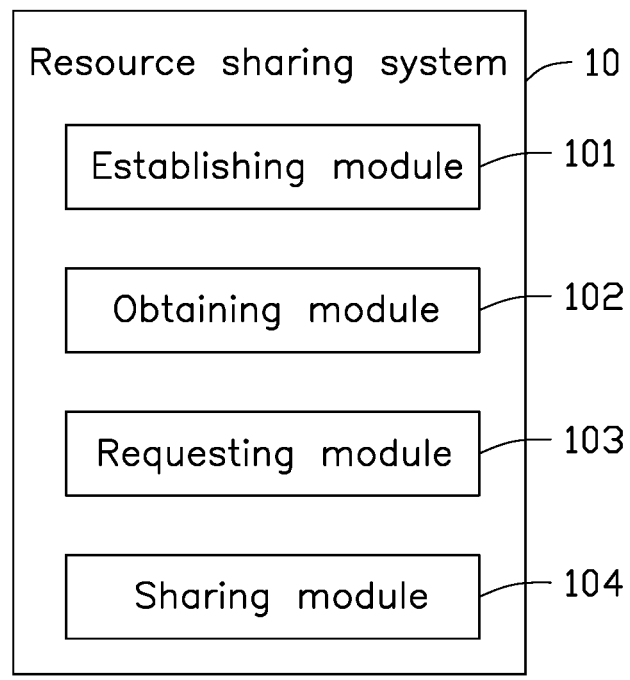
FIG. 3 is a schematic diagram of a resource sharing system according to an embodiment of the present disclosure.

FIG. 3 illustrates a resource sharing system 10. In some embodiments, the resource sharing system 10 operates in a computer device. The computer device is connected to a plurality of user terminals through a network. The resource sharing system 10 may include a plurality of functional modules composed of program code segments. The program code of each program segment in the resource sharing system 10 may be stored in a memory of the computer device and executed by at least one processor to implement a resource sharing function.

In this embodiment, the resource sharing system 10 can be divided into multiple functional modules according to the functions performed by the resource sharing system 10. Referring to FIG. 3, the function modules may include an establishing module 101, an obtaining module 102, a requesting module 103, and a sharing module 104.

The establishing module 101 establishes a sharing domain and stores information of the user terminals joined to the sharing domain.

In one embodiment, the establishing module 101 stores account information of the sharing domain, password information of the sharing domain, and information of the user terminals belonging to the sharing domain. The establishing module 101 controls verification of each user terminal connected to the sharing domain. When the user terminal is connected to the sharing domain, the establishing module 101 firstly identifies whether the user terminal belongs to the sharing domain, whether a login account exists, and whether an entered login password is correct. If one of the above is incorrect or not found, the establishing module 101 rejects the login of the user terminal.

The obtaining module 102 obtains information of sharing resources provided by the user terminal 2 in the sharing domain.

In one embodiment, the sharing resources include a sharing storage space and/or a sharing network traffic. The sharing network traffic includes, but is not limited to, GPRS traffic and WI-FI traffic.

In one embodiment, the method for obtaining information of sharing resources provided by the user terminal in the sharing domain includes at least the following steps:

Obtaining information of resources available for sharing and provided by the user terminal; and Monitoring remaining resources of the user terminal in real time. If the real-time remaining resources are greater than the amount of resources that can be shared, the resources that can be shared by the user terminal is the limited only by the sharing resources that the user terminal can provide. If the real-time remaining resources are less than the amount of shareable resources, the real-time remaining resources are the sharing resource limit that the user terminal can provide.

In one embodiment, the information for providing the sharing resource includes one or more of a content of the sharing resource, a validity date of the sharing resource, and a time when the user terminal provides the sharing resource. If the sharing resource is a sharing network traffic, the obtained sharing network traffic information is stored for grouping according to a validity date of the sharing network traffic.

In one embodiment, the method for grouping and storing the obtained sharing network traffic information according to the validity date of the sharing network traffic may include at least the following sub-blocks S221, S222, and S223.

At sub-block S221, the validity date of the sharing network traffic provided by the user terminal is obtained.

At sub-block S222, the amount of the sharing network traffic provided by the user terminal during the same validity date is summarized.

At sub-block S223, the summarized amount of the sharing network traffic is stored in groups according to different validity dates.

In one embodiment, the sharing resource is a sharing storage space. According to a minimum storage space required for an operation of a system of the user terminal and a personal use preference of the user, the user terminal sets a capacity of the storage space available for sharing and a time of the storage space available for sharing. The user terminal further sends the time and capacity of the storage space available for sharing to the obtaining module 102.

Within a time range available for sharing the storage space, the obtaining module 102 monitors remaining capacity of the storage space of the user terminal in real time, and compares same with the capacity of the storage space that can be shared and set by the user terminal. If a capacity of the real-time remaining storage space is larger than that of the available storage space set by the user terminal, the capacity of the storage space that can be shared and set by the user terminal is the capacity of the storage space that can be provided by the user terminal. If the capacity of the real-time remaining storage space is less than that of the available storage space set by the user terminal, the capacity of the real-time remaining storage space is the capacity of the storage space that can be provided by the user terminal.

In another embodiment, the sharing resource is a sharing network traffic. According to an amount of the traffic required by the user terminal itself and a validity date of the traffic, the user terminal sets a time available for sharing the traffic and an amount of the traffic available for sharing during the validity date of the traffic. The user terminal further sends the time available for sharing the traffic, the amount of the traffic available for sharing, and the validity date of the traffic to the obtaining module 102. The obtaining module 102 receives the traffic information that can be shared from multiple user terminals. The obtaining module 102 firstly summarizes the traffic information within the same validity date according to the validity date of the traffic, and then stores the traffic information according to the different validity dates.

In one embodiment, the unit of the validity date is one day. The computer device summarizes a sum of the traffic that can be shared per day and stores the amount of the traffic that can be shared per day.

Within a time range available for sharing the traffic, the obtaining module monitors a real-time traffic of the user terminal in the sharing domain. If the real-time remaining traffic is larger than the sharing network traffic set by the user terminal, a capacity of the sharing network traffic set by the user terminal is the capacity of the traffic that can be provided by the user terminal. If the real-time remaining traffic is less than the sharing network traffic set by the user terminal, a capacity of real-time remaining traffic is the capacity of sharing network traffic that the user terminal can provide.

The requesting module 103 receives request sent by the user terminal in the sharing domain, requesting an allocation of sharing resources.

In one embodiment, the information in the request includes a type, a time, and a quantity of a request to allocate a sharing resource.

For example, in one embodiment, the user terminal makes request to the requesting module 103 to allocate 5 GB storage space for one week.

In another embodiment, the user terminal requests an allocation of 300M traffic for two days.

In another embodiment, the user terminal requests an allocation of 3 GB storage space for 4 days and 200 MB traffic for one day.

The sharing module 104 allocates the sharing resources according to a predetermined rule.

In one embodiment, the method for allocating the sharing resources according to a predetermined rule may include at least the following sub-blocks S41, S42, and S43.

At sub-block S41, according to a predetermined rule, whether a request sent by the user terminal meets requirements in relation to a rule.

At sub-block S42, if the request sent by the user terminal meets the requirements, the sharing resources are allocated to the user terminal.

At sub-block S43, if the request sent by the user terminal does not meet the requirements, feedback information is sent to the user terminal.

In one embodiment, the predetermined rule may be an IP address of the user terminal and a privilege classification of the user terminal. The privilege classification may include one or more of a type, a number, and a time of the sharing resources that can be shared by the user terminal in the sharing domain.

In another embodiment, the privilege of the user terminal may be set according to the amount of the resources that the user terminal can provide for sharing. The greater the amount of resources that the user terminal can provide for sharing, the greater is or more extensive is the scope of privilege that the user terminal can obtain.

In another embodiment, the predetermined rule may further include determining, according to an IP address of the user terminal, a location of the user terminal in the sharing domain. According to the location, another user terminal available for sharing resources can be searched for in the sharing domain which has a location closer to the user terminal.

For example, the user terminal is a paying user with a user level A in the server. Then the sharing resource types of the user terminal corresponding to the A-level are storage space and traffic, and the capacity of the storage space is 1 GB/day and the capacity of the traffic is 100 MB/day.

The sharing storage space set by the user terminal is 2 GB/day and the traffic that can be shared is 300 MB/day. The storage space and traffic that the user terminal can share every day are greater than the permitted level of the user terminal. The maximum storage space of the user terminal allocated by the server is 1 GB/day, and the traffic is 100 MB/day. When the user terminal requests for sharing network traffic, the server searches for, according to the IP address of the user terminal, another user terminal that is available for sharing network traffic and is closer to the user terminal in the sharing domain.

For another example, the user terminal is a cost-free user. According to the number of the sharing resources that the user terminal can provide, a permitted user level of the user terminal in the sharing domain is determined to be B. Then the sharing resource types of the user terminal corresponding to the B-level are storage space and traffic, and the capacity of the storage space is 800 MB/day and the capacity of the traffic is 80 MB/day.

The sharing storage space set by the user terminal is 500 MB/day and the traffic that can be shared is 50 MB/day. The storage space and traffic that the user terminal can share every day are less than the permitted level of the user terminal. The maximum storage space of the user terminal allocated by the server is 800 MB/day, and the traffic is 50 MB/day.

If two user terminals who are both level B require the computer device to share the storage space of 800 MB/day and the traffic of 50 MB/day, the storage space and the traffic that the server can control may be insufficient to meet the requirements of the two B-level user terminals. The server compares the amount of sharing resources provided by the two B-level user terminals and preferentially makes an allocation to the user terminal which provides more sharing resources.

Figure 4:
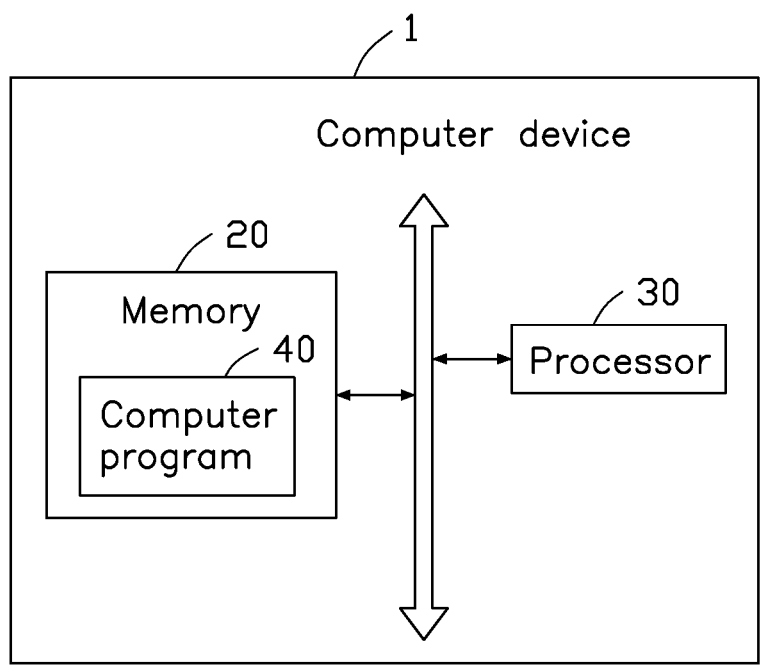
FIG. 4 is a schematic diagram of a computer device in an embodiment of the present disclosure.

FIG. 4 illustrates a computer device 1. The computer device 1 includes a memory 20, a processor 30, and a computer program 40. The computer program 40 can be a resource sharing program. The computer program 40 is stored in the memory 20 and executable by the processor 30. When the processor 30 executes the computer program 40, the blocks in the embodiment of the resource sharing method are implemented, for example, steps S1 to S4 as shown in FIG. 2. Alternatively, when the processor 30 executes the computer program 40, the functions of the modules of the resource sharing system are implemented, for example, the modules 101-104 in FIG. 3.

The computer program 40 can be partitioned into one or more modules that are stored in the memory 20 and executed by the processor 30. The one or more modules may be a series of computer program instruction segments capable of performing a particular function, the instruction segments being used to describe the execution of the computer program 40 in the computer device 1. For example, the computer program 40 can be divided into the establishing module 101, the obtaining module 102, the requesting module 103, and the sharing module 104 in FIG. 3.

The computer device 1 may be a desktop computer, a notebook, a palmtop computer, or a cloud server. It will be understood by those skilled in the art that the schematic diagram is merely an example of the computer device 1, and does not constitute a limitation of the computer device 1. The computer device 1 may include more or less components than those illustrated, and some components may be combined or be different. For example, the computer device 1 may also include input and output devices, network access devices, buses, and the like.

The processor 30 may be a central processing unit (CPU), or may be other general-purpose processors, a digital signal processor (DSP), an application specific integrated circuit (ASIC), Field-Programmable Gate Array (FPGA) or other programmable logic devices, discrete gate or transistor logic device, discrete hardware components, or the like. The general-purpose processor may be a microprocessor or the processor 30 may be any conventional processor or the like. The processor 30 is a control center of the computer device 1 and connects various parts of the entire computer device 1 by using various interfaces and lines.

The memory 20 can be used to store the computer program 40 and/or modules by running or executing computer programs and/or modules stored in the memory 20. The memory 20 may mainly include a storage program area and a storage data area, wherein the storage program area may store an operating system, an application required for at least one function (such as a sound playback function or an image displaying function), and the like. Data and the like created according to the use of the computer device 1 are stored. In addition, the memory 20 may include a high-speed random access memory, and may also include a non-volatile memory such as a hard disk, a memory, a plug-in hard disk, a smart memory card (SMC), and a secure digital (SD) card, flash card, at least one disk storage device, flash device, or other volatile solid-state storage device.

The modules integrated by the computer device 1 can be stored in a computer readable storage medium if implemented in the form of a software functional unit and sold or used as a standalone product. Based on such understanding, the present disclosure implements all or part of the processes in the foregoing embodiments, and may also be completed by a computer program to instruct related hardware. The computer program may be stored in a computer readable storage medium. The steps of the various method embodiments described above may be implemented when the program is executed by the processor. The computer program includes computer program code, which may be in the form of source code, object code form, executable file, or some intermediate form. The computer readable medium may include any entity or device capable of carrying the computer program code, a recording medium, a USB flash drive, a removable hard disk, a magnetic disk, an optical disk, a computer memory, a Read-Only Memory (ROM), Random access memory (RAM), electrical carrier signals, telecommunications signals, and software distribution media. It should be noted that the content contained in the computer readable medium may be appropriately increased or decreased according to the requirements of legislation and patent practice in a jurisdiction, for example, in some jurisdictions, according to legislation and patent practice, computer readable media does not include electrical carrier signals and telecommunication signals.

In the several embodiments provided by the present disclosure, it should be understood that the disclosed computer apparatus and method may be implemented in other manner. The embodiments of the computer device described above are merely illustrative.

In addition, each functional unit in each embodiment of the present disclosure may be integrated in the same processing unit, or each unit may exist physically separately, or two or more units may be integrated in the same unit. The above integrated unit can be implemented in the form of hardware or in the form of hardware plus software function modules.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure, up to and including the full extent established by the broad general meaning of the terms used in the claims.

What is claimed is:

1. A resource sharing method applied to a computer device connected to a user terminal, the method comprising:
   establishing a sharing domain and storing information of the user terminal joined to the sharing domain;
   obtaining information of sharing resources provided by the user terminal in the sharing domain;
   receiving request sent by the user terminal in the sharing domain for requesting an allocation of the sharing resources; and
   allocating the sharing resources according to a predetermined rule;
   wherein when the sharing resource comprises a sharing network traffic, the method further comprises:
      grouping and storing obtained sharing network traffic information according to a validity date of the sharing network traffic;
   wherein the step for grouping and storing the obtained sharing network traffic information according to the validity date of the sharing network traffic further comprises:
      obtaining the validity date of the sharing network traffic provided by the user terminal;

summarizing an amount of the sharing network traffic provided by the user terminal during the same validity date; and storing summarized amount of the sharing network traffic in groups according to different validity dates.

2. The method of claim 1, wherein the sharing resources further comprise at least one of a sharing storage space.

3. The method of claim 1, wherein the information for providing the sharing resource comprises one or more of a content of the sharing resource, a validity date of the sharing resource, and a time when the user terminal provides the sharing resource.

4. The method of claim 1, wherein the step for allocating the sharing resources according to the predetermined rule comprises:

determining whether a request sent by the user terminal meets requirements of a rule;

when the request sent by the user terminal meets the requirements of the rule, the sharing resources are allocated to the user terminal; and when the request sent by the user terminal does not meet the requirements, feedback information is sent to the user terminal, wherein the predetermined rule is an IP address of the user terminal and a privilege classification of the user terminal, the privilege classification comprises one or more of a type, a number, and a time of the sharing resources can be shared by the user terminal in the sharing domain.

5. The method of claim 1, wherein the step for obtaining the information of the sharing resources provided by the user terminal in the sharing domain further comprises:

obtaining information of resources available for sharing, the resource available for sharing is predefined by the user terminal;

monitoring remaining resources of the user terminal in real time;

when the remaining resources of the user terminal in real time are greater than an amount of the resource available for sharing, the sharing resources provided by the user terminal is equivalent to the amount of the resource available for sharing; and when the remaining resources of the user terminal in real time are less than the amount of the resource available for sharing, the sharing resources provided by the user terminal is equivalent to the remaining resources of the user terminal in real time.

6. A computer device comprising:

a processor; and a memory storing a plurality of instructions, which when executed by the processor, cause the processor to:

establish a sharing domain and store information of the user terminal joined to the sharing domain;

obtain information of sharing resources provided by the user terminal in the sharing domain;

receive request sent by the user terminal in the sharing domain for requesting an allocation of the sharing resources; and allocate the sharing resources according to a predetermined rule;

wherein when the sharing resource comprises a sharing network traffic, the processor is further caused to:

group and store obtained sharing network traffic information according to a validity date of the sharing network traffic;

wherein in order to group and store the obtained sharing network traffic information according to the validity date of the sharing network traffic, the processor is further caused to:

obtain the validity date of the sharing network traffic provided by the user terminal;

summarize an amount of the sharing network traffic provided by the user terminal during the same validity date; and store summarized amount of the sharing network traffic in groups according to different validity dates.

7. The computer device of claim 6, wherein the sharing resources further comprise at least one of a sharing storage space.

8. The computer device of claim 6, wherein the information for providing the sharing resource comprises one or more of a content of the sharing resource, a validity date of the sharing resource, and a time when the user terminal provides the sharing resource.

9. The computer device of claim 6, wherein the processor is further caused to:

determine whether a request sent by the user terminal meets requirements of a rule;

when the request sent by the user terminal meets the requirements of the rule, the sharing resources are allocated to the user terminal; and when the request sent by the user terminal does not meet the requirements, feedback information is sent to the user terminal, wherein the predetermined rule is an IP address of the user terminal and a privilege classification of the user terminal, the privilege classification comprises one or more of a type, a number, and a time of the sharing resources can be shared by the user terminal in the sharing domain.

10. The computer device of claim 6, wherein the processor obtaining the information of the sharing resources provided by the user terminal in the sharing domain comprises:

obtaining information of resources available for sharing, the resource available for sharing is predefined by the user terminal;

monitoring remaining resources of the user terminal in real time;

when the remaining resources of the user terminal in real time are greater than an amount of the resource available for sharing, the sharing resources provided by the user terminal is equivalent to the amount of the resource available for sharing; and when the remaining resources of the user terminal in real time are less than the amount of the resource available for sharing, the sharing resources provided by the user terminal is equivalent to the remaining resources of the user terminal in real time.

11. A non-transitory storage medium having stored thereon instructions that, when executed by a processor of a computer device, causes the processor to execute instructions of a resource sharing method, the method comprising:

establishing a sharing domain and storing information of the user terminal joined to the sharing domain;

obtaining information of sharing resources provided by the user terminal in the sharing domain;

receiving request sent by the user terminal in the sharing domain for requesting an allocation of the sharing resources; and allocating the sharing resources according to a predetermined rule;

wherein when the sharing resource comprises a sharing network traffic, the method further comprises:
grouping and storing obtained sharing network traffic information according to a validity date of the sharing network traffic;
wherein the step for grouping and storing the obtained sharing network traffic information according to the validity date of the sharing network traffic further comprises:
obtaining the validity date of the sharing network traffic provided by the user terminal;
summarizing an amount of the sharing network traffic provided by the user terminal during the same validity date; and
storing summarized amount of the sharing network traffic in groups according to different validity dates.

12. The non-transitory storage medium of claim 11, wherein the information for providing the sharing resource comprises one or more of a content of the sharing resource, a validity date of the sharing resource, and a time when the user terminal provides the sharing resource.

13. The non-transitory storage medium of claim 11, wherein the step for allocating the sharing resources according to the predetermined rule comprises:
determining whether a request sent by the user terminal meets requirements of a rule;
when the request sent by the user terminal meets the requirements of the rule, the sharing resources are allocated to the user terminal; and
when the request sent by the user terminal does not meet the requirements, feedback information is sent to the user terminal,
wherein the predetermined rule is an IP address of the user terminal and a privilege classification of the user terminal, the privilege classification comprises one or more of a type, a number, and a time of the sharing resources can be shared by the user terminal in the sharing domain.

14. The non-transitory storage medium of claim 11, wherein the step for obtaining the information of the sharing resources provided by the user terminal in the sharing domain further comprises:
obtaining information of resources available for sharing, the resource available for sharing is predefined by the user terminal;
monitoring remaining resources of the user terminal in real time;
when the remaining resources of the user terminal in real time are greater than an amount of the resource available for sharing, the sharing resources provided by the user terminal is equivalent to the amount of the resource available for sharing; and
when the remaining resources of the user terminal in real time are less than the amount of the resource available for sharing, the sharing resources provided by the user terminal is equivalent to the remaining resources of the user terminal in real time.

* * * * *